(12) United States Patent
Kilian et al.

(10) Patent No.: US 11,336,426 B2
(45) Date of Patent: *May 17, 2022

(54) AUTHENTICATED CONFIRMATION AND ACTIVATION MESSAGE

(71) Applicant: Fraunhofer-Gesellschaft zur Förderung der angewandten Forschung e.V., Munich (DE)

(72) Inventors: Gerd Kilian, Erlangen (DE); Josef Bernhard, Nabburg (DE); Raimund Meyer, Fürth (DE); Dominik Soller, Schwaig (DE); Jakob Kneissl, Fürth (DE); Johannes Wechsler, Spalt (DE); Frank Obernosterer, Nuremberg (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/567,142

(22) Filed: Sep. 11, 2019

(65) Prior Publication Data

US 2020/0052876 A1 Feb. 13, 2020

Related U.S. Application Data

(63) Continuation of application No. PCT/EP2018/056386, filed on Mar. 14, 2018.

(30) Foreign Application Priority Data

Mar. 14, 2017 (DE) ...................... 10 2017 204 184.6

(51) Int. Cl.
*H04J 3/06* (2006.01)
*H04L 7/04* (2006.01)
(Continued)

(52) U.S. Cl.
CPC ........... *H04L 7/041* (2013.01); *H04B 1/7156* (2013.01); *H04L 1/009* (2013.01); *H04L 7/10* (2013.01);
(Continued)

(58) Field of Classification Search
CPC . H04L 7/041; H04L 1/009; H04L 7/10; H04L 9/3242; H04L 9/3247; H04L 69/22;
(Continued)

(56) References Cited

U.S. PATENT DOCUMENTS 6,690,289 B1 * 2/2004 Odinak ................... H04L 9/085
340/4.41
7,464,266 B2 * 12/2008 Wheeler ................... H04L 9/12
713/168
(Continued)

FOREIGN PATENT DOCUMENTS

CN 1578207 A 2/2005
CN 1595978 A 3/2005
(Continued)

OTHER PUBLICATIONS

Japanese Office Action, dated Oct. 27, 2020, in the parallel patent application No. 2019-550836.
(Continued)

*Primary Examiner* — Phuongchau Ba Nguyen
(74) *Attorney, Agent, or Firm* — McClure, Qualey & Rodack, LLP

(57) ABSTRACT

A data transmitter for transmitting data to a data receiver is provided, wherein individual communication information is known to the data transmitter and the data receiver, the data transmitter being configured to generate an individual synchronization sequence while using the individual communication information.

40 Claims, 7 Drawing Sheets

(51) Int. Cl.
   *H04B 1/7156* (2011.01)
   *H04L 1/00* (2006.01)
   *H04L 7/10* (2006.01)
   *H04L 9/32* (2006.01)
   *H04L 69/22* (2022.01)
   *H04W 56/00* (2009.01)

(52) U.S. Cl.
   CPC .......... *H04L 9/3242* (2013.01); *H04L 9/3247* (2013.01); *H04L 69/22* (2013.01); *H04W 56/0015* (2013.01)

(58) Field of Classification Search
   CPC . H04L 9/12; H04L 63/08; H04L 7/042; H04L 9/00; H04L 9/06; H04L 9/0618; H04L 9/0625; H04L 9/063; H04L 9/065; H04L 9/0662; H04L 9/08; H04L 9/0816; H04L 9/0822; H04B 1/7156; H04W 56/0015; H04W 56/00; H04W 56/0045; H04W 84/18; H04W 72/00; H04W 72/12; H04W 72/1278; H04W 72/1289; H04J 3/0682
   See application file for complete search history.

(56) References Cited

U.S. PATENT DOCUMENTS

| | | | |
|---|---|---|---|
| 8,122,250 B2 * | 2/2012 | Haverinen | H04L 63/0807 713/168 |
| 8,837,724 B2 | 9/2014 | Rose et al. | |
| 8,842,833 B2 * | 9/2014 | Natarajan | H04W 12/06 380/274 |
| 9,143,500 B1 | 9/2015 | Gibson | |
| 9,380,041 B2 | 6/2016 | Karpey et al. | |
| 10,009,736 B1 * | 6/2018 | Chu | H04W 40/02 |
| 10,285,135 B2 | 5/2019 | Bernhard et al. | |
| 10,637,532 B2 | 4/2020 | Moraga et al. | |
| 11,070,247 B2 * | 7/2021 | Kilian | H04B 1/7156 |
| 2003/0035543 A1 * | 2/2003 | Gillon | H04N 21/238 380/270 |
| 2004/0066767 A1 | 4/2004 | Lidbrink et al. | |
| 2005/0015597 A1 | 1/2005 | Higurashi | |
| 2005/0058293 A1 | 3/2005 | Higurashi | |
| 2007/0258586 A1 * | 11/2007 | Huang | H04N 5/913 380/201 |
| 2008/0020792 A1 | 1/2008 | Falk et al. | |
| 2008/0065936 A1 | 3/2008 | Pietri et al. | |
| 2011/0093717 A1 * | 4/2011 | Iwao | H04L 9/0891 713/179 |
| 2013/0021908 A1 | 1/2013 | Ceccarelli et al. | |
| 2013/0163761 A1 | 6/2013 | Baras et al. | |
| 2013/0230060 A1 | 9/2013 | Bernhard et al. | |
| 2014/0126721 A1 * | 5/2014 | Baek | G06F 21/602 380/270 |
| 2014/0176341 A1 | 6/2014 | Bernhard et al. | |
| 2014/0310784 A1 | 10/2014 | Cho et al. | |
| 2014/0351598 A1 * | 11/2014 | Abraham | H04W 12/069 713/176 |
| 2016/0036664 A1 | 2/2016 | Madan et al. | |
| 2016/0154106 A1 | 6/2016 | Fernandez-Hernandez | |
| 2018/0098295 A1 * | 4/2018 | Reial | H04W 56/0015 |
| 2018/0241548 A1 * | 8/2018 | Dolev | H04L 9/0656 |
| 2020/0245137 A1 * | 7/2020 | Chitrakar | H04W 12/04 |

FOREIGN PATENT DOCUMENTS

| | | | |
|---|---|---|---|
| CN | 102185817 A | 9/2011 | |
| CN | 102779302 A | 11/2012 | |
| CN | 105492926 A | 4/2016 | |
| DE | 10 2010 043151 A1 | 5/2012 | |
| DE | 10 2011 082 098 A1 | 3/2013 | |
| EP | 1 874 071 A1 | 1/2008 | |
| JP | S62091037 A | 4/1987 | |
| JP | H09055713 A | 2/1997 | |
| JP | H10224340 A | 8/1998 | |
| JP | H11239182 A | 8/1999 | |
| JP | 2009273044 A | 11/2009 | |
| JP | 2011114394 A | 6/2011 | |
| JP | 2012-034169 A | 2/2012 | |
| JP | 2014508436 A | 4/2014 | |
| JP | 2014138404 * | 7/2014 | G06F 21/44 |
| KR | 101434843 B1 | 10/2013 | |
| KR | 101614982 B1 | 2/2014 | |
| KR | 10-2016-0127092 A | 11/2016 | |
| RU | 2433560 C2 | 5/2011 | |
| WO | 2008119050 A2 | 5/2009 | |
| WO | 2011/000109 A1 | 1/2011 | |
| WO | 2013/013168 A2 | 1/2013 | |
| WO | 2013147355 A1 | 10/2013 | |
| WO | 2015/128385 A1 | 9/2015 | |
| WO | 2016/131056 A1 | 8/2016 | |
| WO | 2016121911 A | 8/2016 | |

OTHER PUBLICATIONS

English Translation of Japanese Office Action, dated Oct. 27, 2020, in the parallel patent application No. 2019-550836.

3GPP TS 45.002 V13.4.0, 3rd Generation Partnership Project; Technical Specification Group Radio Access Network; GSM/EDGE Multiplexing and multiple access on the radio path (Release 13); Dec. 2016; pp. 1-140.

3GPP TS 25.211 V13.1.0, 3rd Generation Partnership Project; Technical Specification Group Radio Access Network Physical channels and mapping of transport channels onto physical channels (FDD) (Release 13); Sep. 2016 pp. 1-67.

3GPP TS 36.211 V14.0.0, 3rd Generation Partnership Project; Technical Specification Group Radio Access Network; Evolved Universal Terrestrial Radio Access (E-UTRA); Physical channels and modulation (Release 14); Sep. 2016; pp. 1-170.

Kilian, G., et al; "Improved coverage for low-power telemetry systems using telegram splitting;" Proceedings of 2013 European Conference on Smart Objects, Systems and Technologies (SmartSysTech); Jun. 2013; pp. 1-6.

Kilian, G., et al.; "Increasing Transmission Reliability for Telemetry Systems Using Telegram Splitting;" IEEE Transactions on Communications; vol. 63; No. 3; Mar. 2015; pp. 949-961.

Seddigh. N., et al.; "Security advances and challenges in 4G wireless networks;" Privacy Security and Trust (PST), 2010 Eighth Annual International Conference on, IEEE, Piscataway; Aug. 2010; pp. 62-71.

English language translation of Chinese language office action dated Jun. 25, 2021, issued in application No. CN 201880031769.6.

Korean Office Action, dated Sep. 22, 2020, in patent application No. 10-2019-7030118.

English Translation of Korean Office Action, dated Sep. 22, 2020, in patent application No. 10-2019-7030118.

Russian Office Action dated May 18, 2020, issue in application No. 2019132209.

English language translation of Russian Office Action dated May 18, 2020, issue in application No. 2019132209.

International Search Report dated Mar. 14, 2018.

English Translation of International Search Report dated Mar. 14, 2018.

Chinese language office action dated 2021-06-25, issued in application No. CN 201880031769.6.

Chinese language office action dated Jan. 25, 2022, issued in application No. CN 201880031769.6.

English language translation of Chinese language office action dated Jan. 25, 2022, issued in application No. CN 201880031769.6 (pp. 1-7 of attachment).

Qi, Z., et al.; "Security authentication of Wireless LAN based on synchronous pseudo-random sequence;" Information Security and Communication Privacy; No. 6; 2004; pp. 38-40.

(56) References Cited

OTHER PUBLICATIONS

English language translation of "Security authentication of Wireless LAN based on synchronous pseudo-random sequence;" pp. 1-6 of attachment.

* cited by examiner

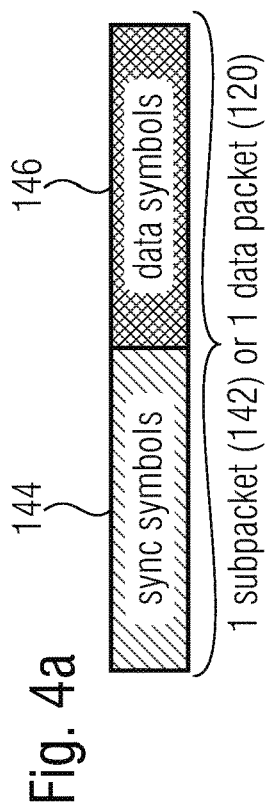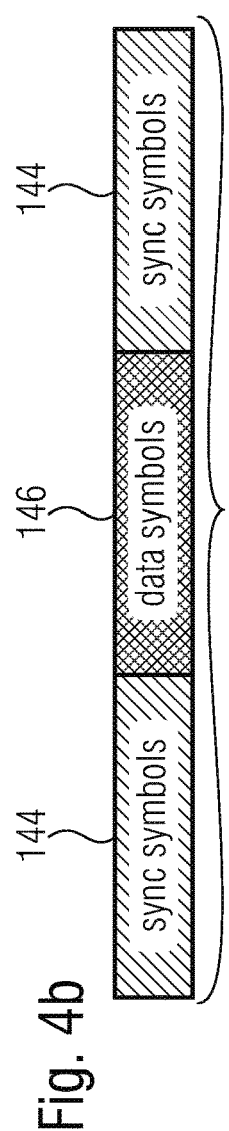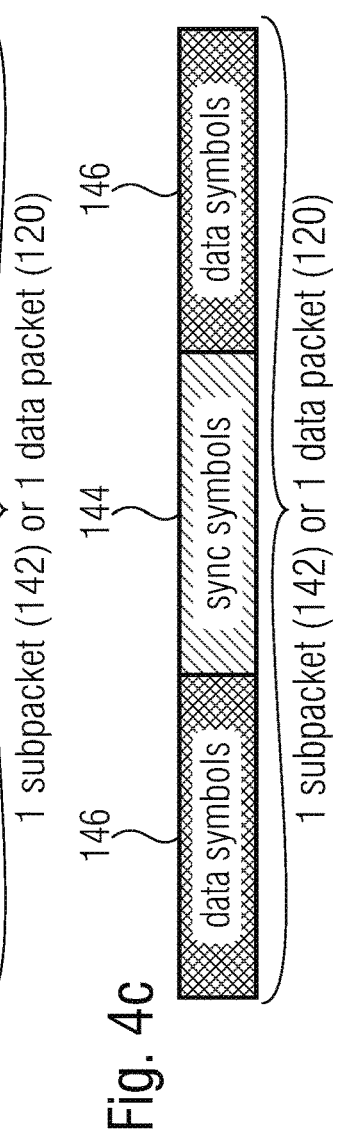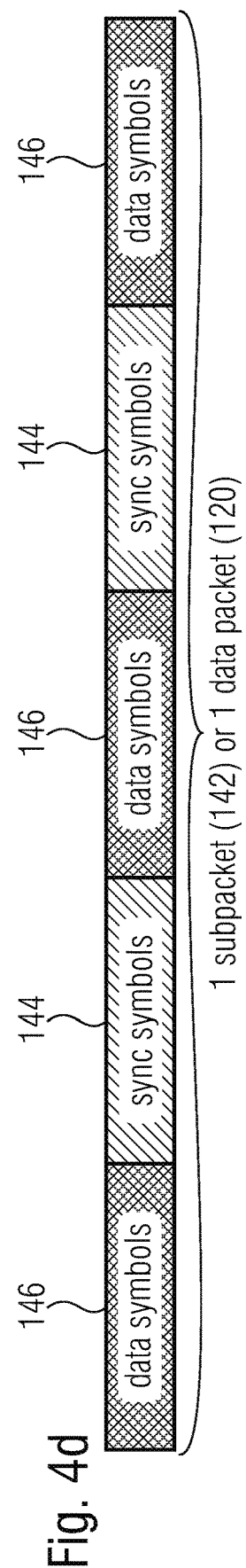

AUTHENTICATED CONFIRMATION AND ACTIVATION MESSAGE

CROSS-REFERENCES TO RELATED APPLICATIONS

This application is a continuation of copending International Application No. PCT/EP2018/056386, filed Mar. 14, 2018, which is incorporated herein by reference in its entirety, and additionally claims priority from German Application No. DE 10 2017 204 184.6, filed Mar. 14, 2017, which is incorporated herein by reference in its entirety.

BACKGROUND OF THE INVENTION

Embodiments of the present invention relate to a data transmitter and a method for transmitting data. Further embodiments relate to a data receiver and a method for receiving data. Some embodiments relate to a data transmitter for transmitting an authenticated confirmation and activation message, and to a data receiver for receiving the same.

In order to be able to synchronize a reception signal in a digital radio transmission system with regard to timeslot, frequency, phase, and sampling phase and to estimate and equalize the usually unknown radio channel, the transmission signal (waveform) in addition to unknown data symbols is also based on synchronization symbols. These symbols are known in advance in the receiver and are often referred to as training, pilot, reference, preamble or midamble symbols. They usually do not carry any unknown (to the receiver) information and therefore may be distinguished from the data symbols actually carrying the information. In current mobile radio systems based on the GSM, UMTS and LTE standards, the synchronization symbols are defined, for example, in the corresponding standard documents, see e.g. [$3^{rd}$ Generation Partnership Project 3GPP TS 45.002, "Multiplexing and multiple access on the radio path"]", [$3^{rd}$ Generation Partnership Project 3GPP TS 25.211, "Physical channels and mapping of transport channels onto physical channels (FDD)"], [$3^{rd}$ Generation Partnership Project 3GPP TS 36.211, "Physical channels and modulation"].

While the synchronization symbols known in advance in the receiver are only used for synchronization and/or channel estimation in the receiver, checking the authenticity of a message in performed while using the data transmitted in the message itself. Often a so-called CMAC sequence (CMAC=cipher-based message authentication code) is used for this purpose. Synchronization and authentication are thus separated from one another.

DE 10 2011 082 098 B1 shows a battery-operated stationary sensor arrangement with unidirectional data transmission using a telegram splitting method for data transmission.

WO 2015/128385 A1 describes a data transmission arrangement with an energy supply device based on an energy harvesting element.

In the publication [G. Kilian, H. Petkov, R. Psiuk, H. Lieske, F. Beer, J. Robert, and A. Heuberger, "Improved coverage for low-power telemetry systems using telegram splitting" in Proceedings of 2013 European Conference on Smart Objects, Systems and Technologies (SmartSysTech), 2013] an improved transmitting/receiving power for low-energy telemetry systems using a telegram splitting method is described.

In the publication [G. Kilian, M. Breiling, H. H. Petkov, H. Lieske, F. Beer, J. Robert, and A. Heuberger, "Increasing Transmission Reliability for Telemetry Systems Using Telegram Splitting", IEEE Transactions on Communications, vol. 63, no. 3, pp. 949-961, March 2015] an improvement in the transmission reliability of telemetry systems using a telegram splitting method is described.

SUMMARY

An embodiment may have a data transmitter for transmitting data to a data receiver, individual communication information being known to the data transmitter and to the data receiver, the data transmitter being configured to generate an individual synchronization sequence while using said individual communication information; said individual communication information being information which authenticates the data transmitter and/or information which authenticates a data packet of the data transmitter, said individual communication information being known only to the data transmitter and to the data receiver, or to the data transmitter and to a group of data receivers.

Another embodiment may have a data receiver for receiving data from a data transmitter transmitted by the data transmitter in a data packet, the data packet being provided with an individual synchronization sequence generated while using individual communication information known to the data transmitter and the data receiver, the data receiver being configured to generate an individual reference synchronization sequence while using the communication information and to detect the data packet to be received while using the individual reference synchronization sequence in a receive data stream or receive data buffer; said individual communication information being information authenticating the data transmitter and/or a data packet of the data transmitter; said individual communication information being known only to the data transmitter and to the data receiver, or to the data transmitter and to a group of data receivers.

Yet another embodiment may have a data transmitter for transmitting data to a plurality of data receivers, wherein individual communication information for individual communication between the data transmitter and the one data receiver is known to the data transmitter and to one data receiver of the plurality of data receivers, the data transmitter being configured to generate an individual synchronization sequence while using the communication information and to provide a data packet to be transmitted with the individual synchronization sequence for synchronization of the data packet in the data receiver; said communication information being information authenticating the data transmitter and/or information authenticating a data packet of the data transmitter; said individual communication information being known only to the data transmitter and to the data receiver, or to the data transmitter and to a group of data receivers.

According to another embodiment, a system may have: an inventive data transmitter; and an inventive data receiver.

According to another embodiment, a method for transmitting data to a data receiver may have the steps of: generating an individual synchronization sequence while using individual communication information known to the data transmitter and the data receiver; and transmitting a data packet containing the individual synchronization sequence for synchronizing the data packet in the data receiver; said individual communication information being information authenticating the data transmitter and/or information authenticating a data packet of the data transmitter; said individual communication information being known only to the data transmitter and to the data receiver, or to the data transmitter and to a group of data receivers.

According to another embodiment, a method for receiving data from a data transmitter transmitted by the data transmitter in a data packet, the data packet being provided with an individual synchronization sequence generated while using individual communication information known to the data transmitter and the data receiver, may have the steps of: generating an individual reference synchronization sequence while using the individual communication information; detecting the data packet in a receive data stream or receive data buffer while using the individual reference synchronization sequence; and receiving the detected data packet; said individual communication information being information authenticating the data transmitter and/or information authenticating a data packet of the data transmitter; said individual communication information being known only to the data transmitter and to the data receiver, or to the data transmitter and to a group of data receivers.

According to yet another embodiment, a method for transmitting an authenticated confirmation of receipt which confirms receipt of a preceding data packet transmitted by a first subscriber of a communication system may have the steps of: receiving the preceding data packet with a second subscriber of the communication system; and transmitting a data packet having an individual synchronization sequence from the second subscriber to the first subscriber upon successful receipt of the preceding data packet, the individual synchronization sequence being generated from individual communication information which is individually assigned to the first subscriber and the second subscriber for mutual communication; said communication information being information authenticating the data transmitter and/or information authenticating a data packet of the data transmitter; said individual communication information being known only to the data transmitter and to the data receiver, or to the data transmitter and to a group of data receivers.

Yet another embodiment may have a data transmitter for transmitting data to a data receiver, wherein individual communication information is known to the data transmitter and the data receiver, the data transmitter being configured to generate an individual synchronization sequence while using the individual communication information; said data transmitter being configured to derive the individual communication information from a preceding communication between the data transmitter and the data receiver; wherein the individual communication information is a cryptographic signature; or wherein the individual communication information is an encrypted part of the preceding communication; said individual communication information being known only to the data transmitter and to the data receiver, or to the data transmitter and to a group of data receivers.

Yet another embodiment may have a data receiver for receiving data from a data transmitter transmitted by the data transmitter in a data packet, the data packet being provided with an individual synchronization sequence generated while using individual communication information known to the data transmitter and to the data receiver, the data receiver being configured to generate an individual reference synchronization sequence while using the communication information and to detect the data packet to be received while using the individual reference synchronization sequence in a receive data stream or receive data buffer; said data receiver being configured to derive the individual communication information from a preceding communication between the data transmitter and the data receiver; wherein the individual communication information is a cryptographic signature; or wherein the individual communication information is an encrypted part of the preceding communication; said individual communication information being known only to the data transmitter and to the data receiver, or to the data transmitter and to a group of data receivers.

According to yet another embodiment, a method for transmitting data to a data receiver may have the steps of: generating an individual synchronization sequence while using individual communication information known to the data transmitter and the data receiver; and transmitting a data packet having the individual synchronization sequence for synchronizing the data packet in the data receiver; said individual communication information being derived from a preceding communication between the data transmitter and the data receiver; wherein the individual communication information is a cryptographic signature; or wherein the individual communication information is an encrypted part of the preceding communication; said individual communication information being known only to the data transmitter and to the data receiver, or to the data transmitter and to a group of data receivers.

According to yet another embodiment, a method for receiving data from a data transmitter transmitted by the data transmitter in a data packet, the data packet being provided with an individual synchronization sequence generated while using individual communication information known to the data transmitter and to the data receiver, may have the steps of: generating an individual reference synchronization sequence while using the individual communication information; detecting the data packet in a receive data stream or receive data buffer while using the individual reference synchronization sequence; and receiving the detected data packet; said individual communication information being derived from a preceding communication between the data transmitter and the data receiver; wherein the individual communication information is a cryptographic signature; or wherein the individual communication information is an encrypted part of the preceding communication; said individual communication information being known only to the data transmitter and to the data receiver, or to the data transmitter and to a group of data receivers.

Yet another embodiment may have a computer program for carrying out the inventive methods.

Embodiments provide a data transmitter for transmitting data to a data receiver, wherein individual communication information is known to the data transmitter and the data receiver, the data transmitter being configured to generate an individual synchronization sequence using the individual communication information.

Embodiments provide a data transmitter for transmitting data to a plurality of data receivers, wherein individual communication information for individual communication between the data transmitter and the one data receiver is known to the data transmitter and to one data receiver of the plurality of data receivers, the data transmitter being configured to generate an individual synchronization sequence using the communication information and to provide a data packet to be transmitted with the individual synchronization sequence for synchronization of the data packet in the data receiver.

Embodiments provide a data receiver for receiving data from a data transmitter being transmitted by the data transmitter in a data packet, wherein the data packet is provided with an individual synchronization sequence which is generated while using individual communication information known to the data transmitter and the data receiver, the data receiver being configured to generate an individual reference synchronization sequence while using the communication information and to detect the data packet to be received while using the individual reference synchronization sequence in a receive data stream or receive data buffer.

This present invention is based on the concept of using an individual synchronization sequence for the communication between the data transmitter and the data receiver, instead of a conventional synchronization sequence known to all or several not specifically selected subscribers (data transmitters and data receivers) of a communication system, which is derived from individual communication information (e.g. a signature) that is only known to the data transmitter and the data receiver (or a limited group of data transmitters and/or data receivers) or individually assigned to them for mutual communication.

Further embodiments provide a method for transmitting data to a data receiver. The method includes a step of generating an individual synchronization sequence while using individual communication information which is known to the data transmitter and the data receiver. The method further includes a step of transmitting a data packet having the individual synchronization sequence to synchronize the data packet in the data receiver.

Further embodiments provide a method for receiving data from a data transmitter being transmitted by the data transmitter in a data packet, wherein the data packet is provided with an individual synchronization sequence generated while using individual communication information that is known to the data transmitter and the data receiver. The method includes a step of generating an individual reference synchronization sequence while using the individual communication information. The method further includes a step of detecting the data packet in a receive data stream or receive data buffer while using the individual reference synchronization sequence. Further, the method includes a step of receiving the detected data packet.

Further embodiments provide a method for transmitting an authenticated confirmation of receipt which confirms the receipt of a preceding data packet transmitted by a first subscriber of a communication system. The method includes a step of receiving the preceding data packet from a second subscriber of the communication system. The method further includes a step of transmitting a data packet having an individual synchronization sequence from the second subscriber to the first subscriber upon successful receipt of the preceding data packet, wherein the individual synchronization sequence is generated from individual communication information individually assigned to the first subscriber and the second subscriber for mutual communication.

In the following, advantageous further developments of the data transmitter are described.

In embodiments, the data transmitter may be configured to provide a data packet to be transmitted with the individual synchronization sequence for synchronization of the data packet in the data receiver.

In embodiments, the individual synchronization sequence can be a sequence of synchronization symbols.

In embodiments, the individual communication information can be individual for the communication between the data transmitter and the data receiver.

For example, the individual communication information may be individually assigned to the data transmitter and the data receiver, e.g. by the data transmitter or the data receiver itself or by another unit of the communication system, such as another data transmitter or data receiver or a central control unit.

In embodiments, the communication information may be known only to the data transmitter and the data receiver (or a limited group of data receivers).

For example, the individual communication information may be used individually for the communication between the data transmitter and the data receiver, e.g. only for the communication between the data transmitter and the data receiver (or a group of data receivers) (and not for the communication with another data transmitter or another data receiver (or another group of data receivers)).

In embodiments, the data transmitter can be configured to renew the communication information after each data packet, after a preset number of data packets, or after a preset or certain time interval.

In embodiments, the communication information may be information authenticating the data transmitter and/or information authenticating a data packet of the data transmitter.

In embodiments, the communication information can be a signature.

For example, the communication information can be a cipher-based message authentication code.

In embodiments, the data transmitter may be configured to transmit a data packet containing the communication information to the data receiver in advance or to receive the communication information in advance from the data receiver.

In embodiments, the data transmitter may be configured to provide the data packet with a synchronization sequence which is only known to the data receiver and/or a limited group of data receivers.

For example, the individual communication information can only be known in the data transmitter and data receiver. However, it is also possible that the individual communication information between the transmitter and several specifically selected data receivers is known without the individual communication information losing its "individuality". The limited group of data receivers may be determined by the data transmitter, the data receiver, another data sender, another data receiver, a central control unit, a server, or an administrator, for example.

In embodiments, the data transmitter may be configured to divide the data packet into a plurality of sub-data packets and to transmit the plurality of sub-data packets in a distributed manner in time and/or frequency to the data receiver. The data transmitter can be configured to divide the data packet into the plurality of sub-data packets so that the individual synchronization sequence (and optionally data (e.g. user data)) is divided into the plurality of sub-data packets. The data transmitter may be configured to generate a time hopping pattern and/or frequency hopping pattern with which the plurality of sub-data packets are transmitted so as to be distributed in time and/or frequency while using the individual communication information.

In embodiments, the data transmitter may be configured to generate the individual synchronization sequence while using a mapping rule (mapping specification).

In embodiments, the data transmitter may be configured to repeatedly (several times) transmit the data packet with the individual synchronization sequence. The data transmitter may be configured to divide the data packet into a plurality of sub-data packets, and to transmit the plurality of sub-data packets to the data receiver in a distributed manner in time and/or frequency according to a time and/or frequency hopping pattern, and to use a different time and/or frequency hopping pattern in the repeated transmission of the data packet.

In embodiments, the data packet with the individual synchronization sequence can be a confirmation message through said individual synchronization sequence which the data transmitter transmits in response to a correct receipt of a preceding data packet. For example, the data packet with the individual synchronization sequence can be a confirmation of receipt of a preceding message.

In embodiments, the data transmitter may be configured to provide the data packet with additional activation information about at least one further data packet to be transmitted by the data transmitter. The activation information can specify a transmission time or structure information of the at least one further data packet. For example, the structure information can be a data packet size, a data packet length, a number of sub-data packets, or a time and/or frequency hopping pattern.

In the following, advantageous further developments of the data receiver are described.

In embodiments, the individual communication information can be individual for the communication between the data transmitter and the data receiver.

For example, the individual communication information may be individually assigned to the data transmitter and the data receiver, e.g. by the data transmitter or the data receiver itself or by another unit of the communication system, such as another data transmitter or data receiver or a central control unit.

In embodiments, the individual communication information may be only known to the data transmitter and the data receiver or to a limited group of data receivers.

In embodiments, the communication information may be information authenticating the data transmitter and/or information authenticating a data packet of the data transmitter.

In embodiments, the communication information can be a signature. For example, the communication information can be a cipher-based message authentication code.

In embodiments, the data receiver may be configured to synchronize the data packet with the individual synchronization sequence while using the reference synchronization sequence. Furthermore, the data receiver may be configured to estimate the channel between the data transmitter and the data receiver while using the synchronization sequence.

In embodiments, the data receiver may be configured to decode data of the data packet while using the received individual synchronization sequence.

In embodiments, the data receiver may be configured to decode the data of the data packet while using the received individual synchronization sequence to authenticate the data transmitter.

In embodiments, the data receiver can be configured to let the received individual synchronization sequence flow into the decoding as an unknown sequence when decoding the data packet.

For example, the (actually known) individual synchronization sequence can only be assumed to be unknown for decoding and treated as an (unknown) data sequence with regard to decoding.

In embodiments, the data receiver may be configured to receive a data packet with the communication information in advance from the data transmitter or to transmit a data packet with the communication information in advance to the data transmitter. The data receiver may be configured to detect the data packet with the communication information, which is provided with a synchronization sequence, in a receive data stream while using a reference synchronization sequence known to the data receiver and further data receivers.

In embodiments, the data packet can be transmitted divided into a plurality of sub-data packets, wherein the plurality of sub-data packets is transmitted in a distributed manner in time and/or frequency. For this purpose, the data receiver may be configured to receive and combine the plurality of sub-data packets in order to obtain the data packet. The plurality of sub-data packets may be transmitted while using a time hopping pattern and/or frequency hopping pattern so that they are distributed in time and/or frequency. For this purpose, the data receiver may be configured to determine the time hopping pattern and/or frequency hopping pattern while using the individual communication information in order to receive the plurality of sub-data packets.

In embodiments, the data receiver may be configured to generate the individual reference synchronization sequence while using a mapping rule.

In embodiments, the data packet can be provided with additional activation information about at least one other data packet to be transmitted by the data transmitter. For this purpose, the data receiver may be configured to receive the at least one further data packet while using the activation information. The activation information can specify a transmission time or structure information of the at least one further data packet. For example, the structure information can be a time and/or frequency hopping pattern or data packet length.

BRIEF DESCRIPTION OF THE DRAWINGS

Embodiments of the present invention will be detailed subsequently referring to the appended drawings, in which:

FIG. 4a shows a schematic view of a first arrangement of synchronization symbols and data symbols in a data packet or sub-data packet, in which a block with the synchronization symbols is preceded by a block with the data symbols;

FIG. 4b shows a schematic view of a second arrangement of synchronization symbols and data symbols in a data packet or sub-data packet in which a block of data symbols is arranged between two blocks of synchronization symbols;

FIG. 4c shows a schematic view of a third arrangement of synchronization symbols and data symbols in a data packet or sub-data packet, in which a block of synchronization symbols is arranged between two blocks of data symbols;

FIG. 4d shows a schematic view of a fourth arrangement of synchronization symbols and data symbols in a data packet or sub-data packet, in which blocks of data symbols and blocks of synchronization symbols are alternately arranged in the data packet or sub-data packet;

DETAILED DESCRIPTION OF THE INVENTION

Figure 1:
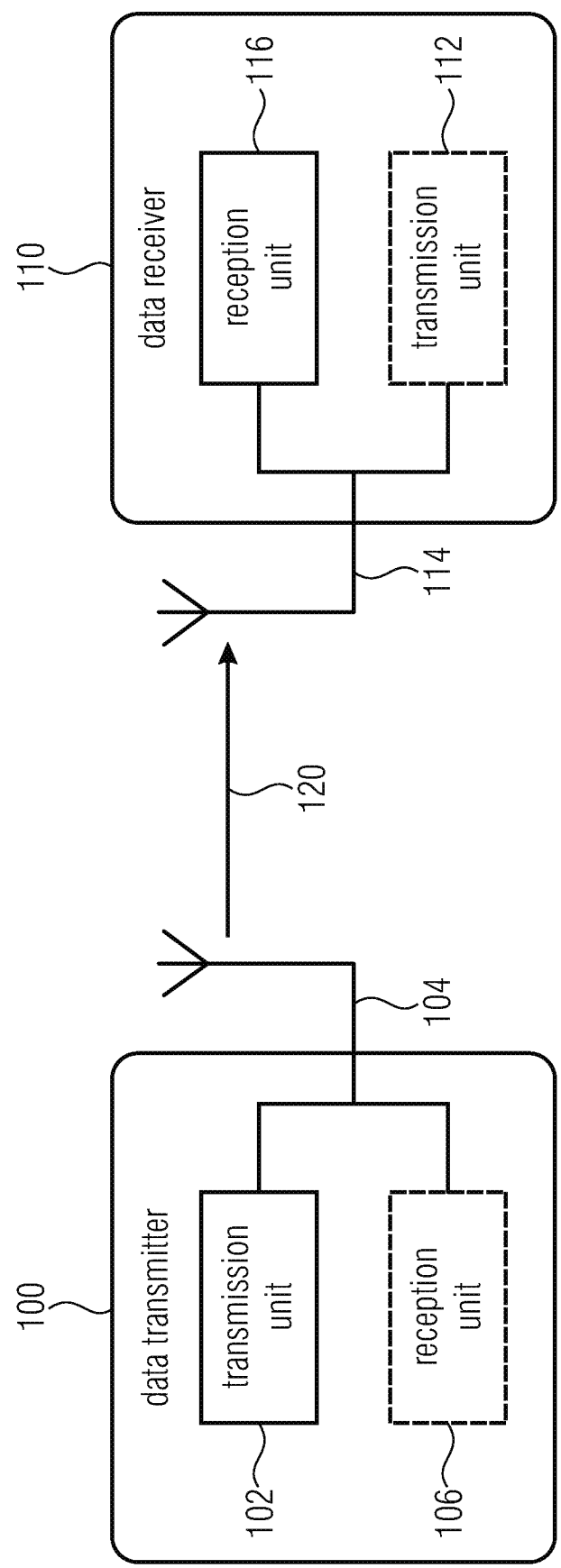
FIG. 1 shows a schematic block diagram of a system comprising a data transmitter and a data receiver, in accordance with an embodiment of the present invention.

In the following description of the embodiments of the present invention, elements which are identical or identical in action will be referred to by identical reference numerals in the figures so that their respective descriptions in the different embodiments are interchangeable.

FIG. 1 shows a schematic block diagram of a system with a data transmitter 100 and a data receiver 110 according to an embodiment of the present invention.

Individual communication information is known to the data transmitter 100 and the data receiver 110.

The data transmitter 100 is configured to generate an individual synchronization sequence while using the individual communication information and to provide a data packet 120 to be transmitted with the individual synchronization sequence for synchronization of the data packet 120 in the data receiver 110, and to transmit the data packet 120 to the data receiver 110.

The data receiver 110 is configured to generate an individual reference synchronization sequence while using the communication information and to detect the data packet 120 to be received while using the individual reference synchronization sequence in a receive data stream or receive data buffer.

For example, the individual communication information can be individual for the communication between the data transmitter 100 and the data receiver 110. Thus, the individual communication information can be individually assigned to the data transmitter 100 and the data receiver, e.g. by the data transmitter or the data receiver or by another unit of the communication system, such as another data transmitter or data receiver or a central control unit. The individual communication information can be individual for the communication between the data transmitter 100 and the data receiver regarding the data packet 120, e.g. only for the communication between the data transmitter 100 and the data receiver 110 (or a group of data receivers) (and not for the communication with another data transmitter or another data receiver (or another group of data receivers)). Thus, it is possible that the individual communication information is known only to the data transmitter 100 and the data receiver 110 (or to the group of data receivers).

The data transmitter 100 and the data receiver 110 can generate the individual synchronization sequence or the individual reference synchronization sequence while using the individual communication information (e.g. while using the same algorithm or the same mapping or derivation rule) so that the individual synchronization sequence and the individual reference synchronization sequence are the same. For example, the data receiver 110 thus can detect (or find) the individual synchronization sequence (and thus the data packet 120) in the receive data stream by correlating the receive data stream with the reference synchronization sequence.

Through the individual synchronization sequence, the data transmitter 100 can approach (or select, or address) the data receiver 110, while the data receiver can determine from the individual synchronization sequence whether it is approached (or selected, or addressed) by it.

As exemplarily shown in FIG. 1, the data transmitter 100 may have a transmission device (or transmission module, or transmitter) 102 which is configured to transmit the data packet 120. The transmission device 102 can be connected to an antenna 104 of the data transmitter 100. The data transmitter 100 may further include a reception unit (or receiving module, or receiver) 106 which is configured to receive a data packet. The reception unit 106 can be connected to the antenna 104 or a further (separate) antenna of the data transmitter 100. The data transmitter 100 can also have a combined transmitter/receiver (transceiver).

The data receiver 110 may include a reception unit (or receiving module, or receiver) 116 configured to receive the data packet 120. The reception unit 116 can be connected to an antenna 114 of the data receiver 110. Further, the data receiver 110 may include a transmission device (or transmission module, or transmitter) 112 configured to transmit a data packet. The transmission device 112 can be connected to the antenna 114 or to a further (separate) antenna of the data receiver 110. The data receiver 110 may also have a combined transmitter/receiver (transceiver).

In embodiments, the data transmitter 100 can be a sensor node, while the data receiver 110 can be a base station. Typically, a communication system comprises at least one data receiver 110 (base station) and a plurality of data transmitters (sensor nodes such as heating meters). Of course, it is also possible that the data transmitter 100 is a base station, while the data receiver 110 is a sensor node. Furthermore, it is possible that both the data transmitter 100 and the data receiver 110 are sensor nodes. In addition, it is possible that both the data transmitter 100 and the data receiver 110 are base stations.

The data transmitter 100 and the data receiver 110 may be optionally configured to transmit or receive the data packet 120 while using the telegram splitting method. Thereby, the data packet 120 is divided into a plurality of sub-data packets (or partial packets) and the sub-data packets are transmitted in a distributed manner in time and/or in a distributed manner in frequency from the data transmitter to the data receiver, wherein the data receiver reassembles (or combines) the sub-data packets in order to obtain the data packet 120. Each of the sub-data packets thereby contains only a part of the data packet 120. The data packet 120 can be channel-coded so that for error-free decoding of the data packet, not all sub-data packets but only some of the sub-data packets may be used.

The temporal distribution of the majority of sub-data packets can take place according to a time hopping pattern. The time hopping pattern can specify a sequence of transmission times or transmission time intervals with which the sub-data packets are transmitted. For example, a first sub-data packet may be transmitted at a first transmission time (or in a first transmission timeslot) and a second sub-data packet may be transmitted at a second transmission time (or in a second transmission timeslot), wherein the first transmission time and the second transmission time are different. The time hopping pattern thereby can define (or preset, or specify) the first transmission time and the second transmission time. Alternatively, the time hopping pattern can specify the first transmission time and a time interval between the first transmission time and the second transmission time. Of course, the time hopping pattern can also only specify the time interval between the first point in time and the second transmission time. There may be breaks in transmission between the sub-data packets during which transmission is not taking place. The sub-data packets can also overlap in time (coincide).

The distribution in frequency of the majority of sub-data packets can take place according to a frequency hopping pattern. The frequency hopping pattern can specify a sequence of transmission frequencies or transmission frequency hoops with which the sub-data packets are transmitted. For example, a first sub-data packet can be transmitted with a first transmission frequency (or in a first frequency channel) and a second sub-data packet can be transmitted with a second transmission frequency (or in a second frequency channel), wherein the first transmission frequency and the second transmission frequency are different. The frequency hopping pattern can define (or preset, or specify) the first transmission frequency and the second transmission frequency. Alternatively, the frequency hopping pattern can specify the first transmission frequency and a frequency interval (transmission frequency hopping) between the first transmission frequency and the second transmission frequency. Of course, the frequency hopping pattern can also only specify the frequency interval (transmission frequency hopping) between the first transmission frequency and the second transmission frequency.

Of course, the majority of sub-data packets can also be transmitted in a distributed manner in both time and frequency from the data transmitter 100 to the data receiver 110. The distribution of the majority of sub-data packets in time and frequency can be done according to a time and frequency hopping pattern. A time and frequency hopping pattern can be the combination of a time hopping pattern and a frequency hopping pattern, i.e. a sequence of transmission times or transmission time intervals at which the sub-data packets are transmitted, wherein transmission frequencies (or transmission frequency hoops) are assigned to the transmission times (or transmission time intervals).

The time and/or frequency hopping pattern used for the transmission of the plurality of sub-data packets may be generated by the data transmitter 100 and the data receiver 110 while using the individual communication information. Thus, also the time and/or frequency hopping pattern used can be an individual time and/or frequency hopping pattern, i.e. individually for the communication between the data transmitter 100 and the data receiver 110 or individually for the data packet 120.

Figure 2:
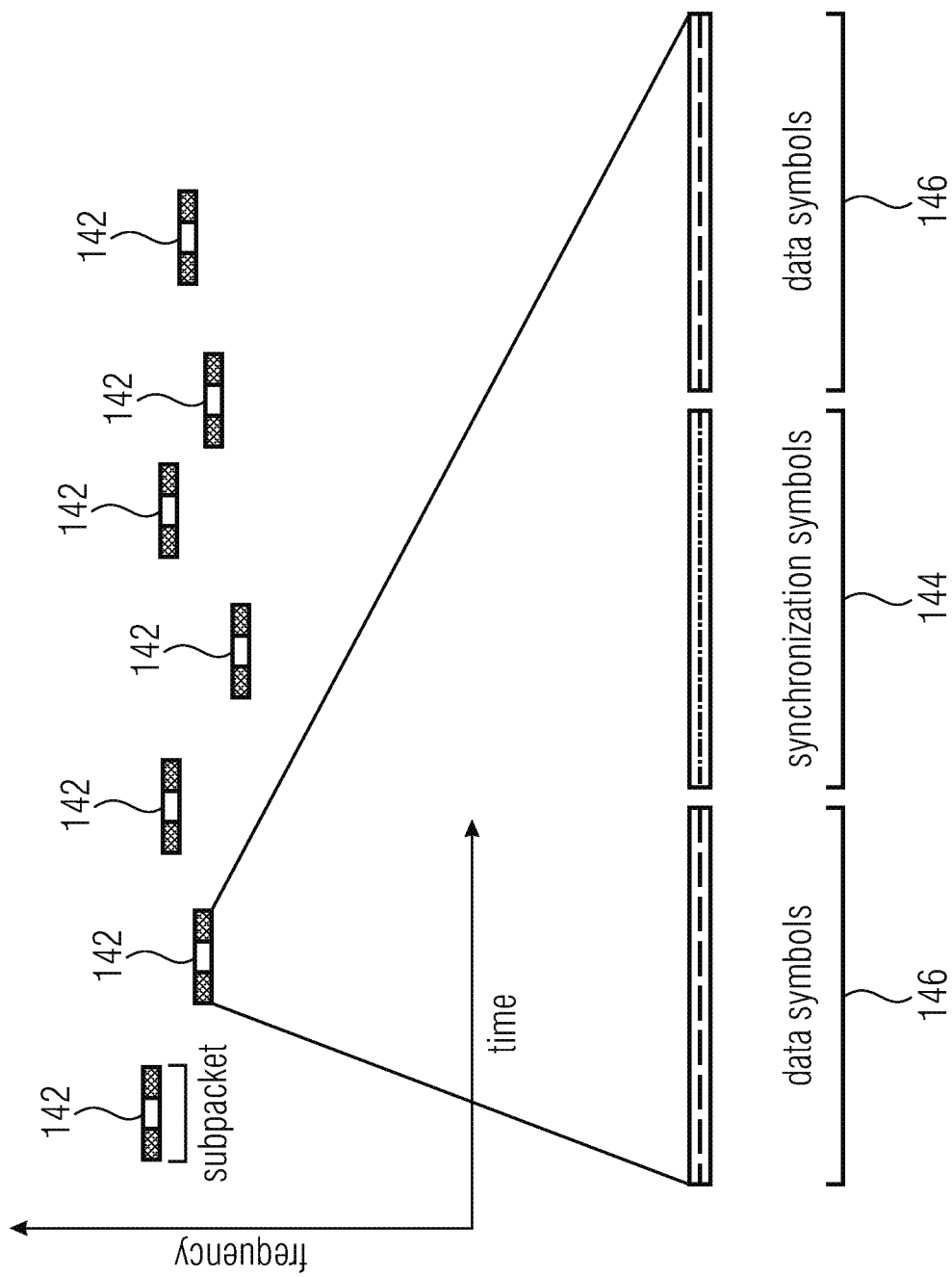
FIG. 2 shows, in a diagram, occupancy of the transmission channel during the transmission of a plurality of sub-data packets in accordance with a time and frequency hopping pattern.

FIG. 2 shows, in a diagram, an occupancy of the transmission channel during the transmission of a plurality of sub-data packets 142 according to a time and frequency hopping pattern. The ordinate thereby describes the frequency and the abscissa the time.

As can be seen in FIG. 2, the data packet 120 can be exemplarily divided into n=7 sub-data packets 142 and transmitted from the data transmitter 100 to the data receiver 110 according to a time and frequency hopping pattern distributed in time and frequency.

As can be further seen in FIG. 2, the individual synchronization sequence 144 can also be divided among the plurality of sub-data packets 142 so that the plurality of sub-data packets 142 each contain a part of the individual synchronization sequence (synchronization symbols in FIG. 2) 144 in addition to data (data symbols in FIG. 2) 146.

In the following, detailed embodiments of the data transmitter 100 and data receiver 110 are described in more detail. The use of the telegram splitting method is purely optional, i.e. the data packet 120 can be transmitted between data transmitter 100 and data receiver 110 both directly (or in one piece, or as a whole) as well as distributed over the majority of sub-data packets 142.

First Detailed Embodiment

The data packet 120 with the individual synchronization sequence can be a confirmation message emitted by the data transmitter 100 to confirm a state or event.

Due to the fact that the individual synchronization sequence is individual for the communication between the data transmitter 100 and the data receiver 110, the data receiver 110 can be sure that the data packet 120 actually originates from the data transmitter 100.

For example, the data transmitter 100 can be configured to emit the data packet 120 with the individual synchronization sequence in response to the successful receipt of a preceding data packet (=event). The data packet 120 with the individual synchronization sequence can therefore be a confirmation message due to the individual synchronization sequence, with which the data transmitter 100 confirms the successful receipt of the preceding data packet. This example is explained further below with reference to FIG. 3.

Figure 3:
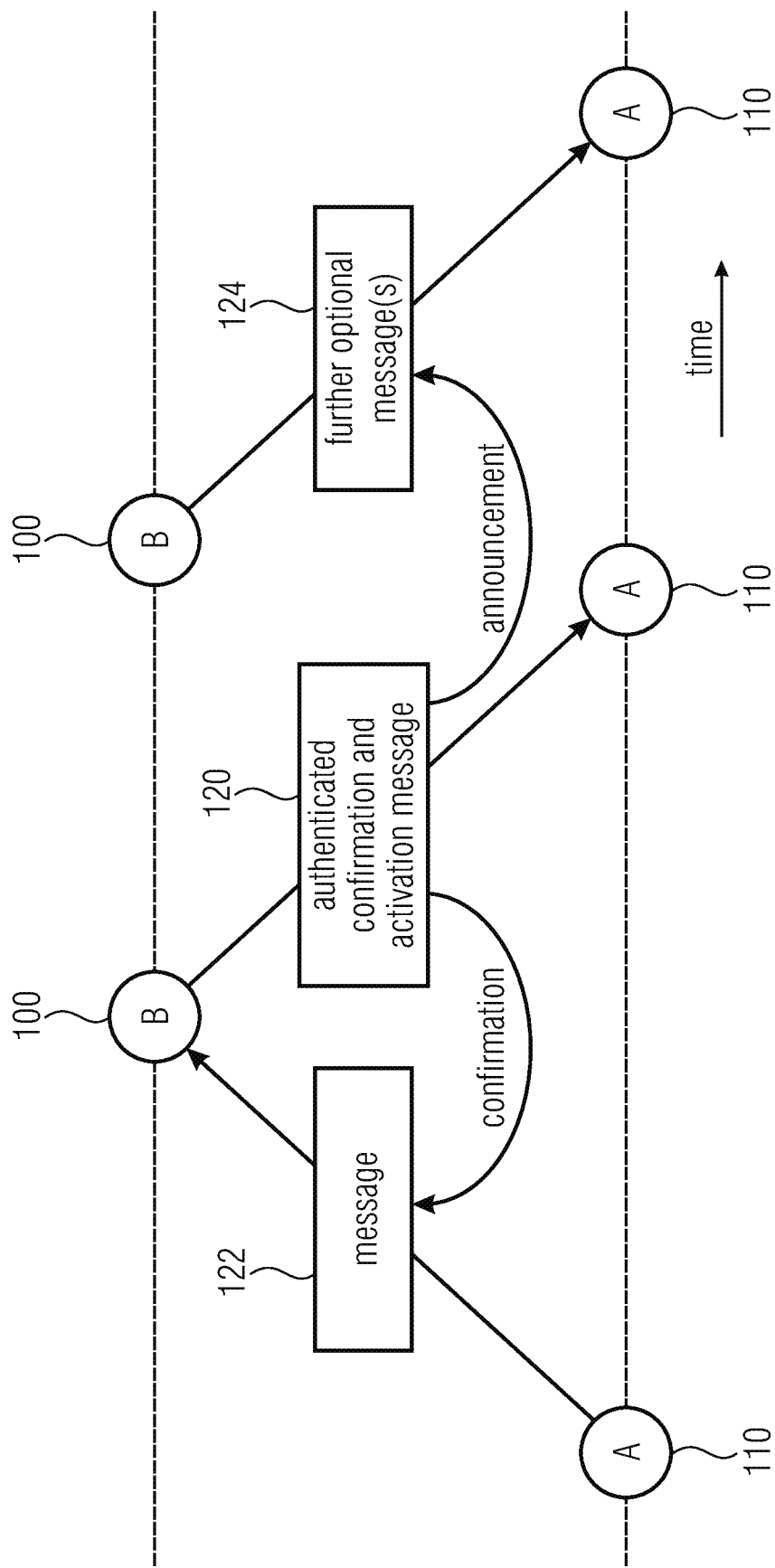
FIG. 3 shows a schematic communication sequence between a data transmitter and a data receiver, in accordance with an embodiment.

FIG. 3 shows a schematic communication sequence between the data transmitter 100 (subscriber A) and the data receiver 110 (subscriber B), according to an embodiment. Thereby, it is assumed that both data transmitter 100 and data receiver 110 are transceivers.

In a first step, subscriber A 110 transmits a message (e.g. a data packet) 122 to subscriber B 100. In a second step, subscriber B 100 transmits a confirmation message (=data packet 120 with the individual synchronization sequence) to subscriber A 110. With the confirmation message, subscriber B 100 confirms the receipt of the message 122. Optionally, subscriber B 100 can transmit an activation message to subscriber A 110 together with the confirmation message. Subscriber B 100 can also provide the data packet 120 with activation information, wherein the activation information can specify a transmission time of at least one further data packet and/or structural information (e.g. time and/or frequency hopping pattern) of the at least one further data packet. In a third step, subscriber B 100 can transmit at least one further optional message (e.g. at least one further data packet) 124 to subscriber A 110 according to the preceding activation information.

In embodiments, authentication of the message is linked to the synchronization sequence. Authenticating the message can be done by transmitting an individual, dynamically calculated symbol sequence which is known in advance to the data receiver 110 and which simultaneously serves as a synchronization sequence for the data receiver 110. Therefore, emission of fixed synchronization symbols which are defined in advance in a standard or a waveform specification, can be dropped.

The prerequisite for the application of this method is individual communication information, e.g. a communication between data transmitter 100 and data receiver 110 preceding the current transmission, from which both subscribers can derive individual communication information, e.g. a numerical (e.g. binary) signature or a CRC, or part of the transmitted data, e.g. in the form of a CMAC, according to a method known to both subscribers. From this signature, the symbols of the synchronization sequence can be calculated according to a suitable method.

In addition to the authenticated confirmation of receipt, the message can optionally be used to transmit further information which is not known in advance to the data receiver of the confirmation of receipt. This part of the message can be referred to as the data sequence in demarcation to the synchronization sequence. For example, the data receiver can be informed at which point in time it can expect a new data transmission from the data transmitter and what length (e.g. packet length), which structure, which hopping pattern or other parameters the new data transmission has so that the data receiver can return to reception readiness at the appropriate point in time, if need be, after a rest period.

Second Detailed Embodiment

The authenticated confirmation of receipt can be transmitted in the form of a message consisting of one or more associated sub-data packets ("telegram splitting") 142 (see FIG. 2). In the optional case of telegram splitting, emission of the sub-data packets 142 can be done according to the assigned values "transmission time" and/or "transmission frequency".

The data packet 120 (message) may contain two basically distinguishable symbol types. Synchronization symbols known in advance in the data receiver 110 and data symbols unknown in advance in the data receiver 110. The exact arrangement of the above symbols in relation to each other, e.g. in the form of symbol blocks, is irrelevant. FIGS. 4a to 4d exemplarily illustrate several options for the structure of the data packet (message) or the sub-data packets 142 of the data packet. Numerous further arrangements are conceivable, in particular also entanglements of synchronization and data symbols. In the case of telegram splitting, each sub-data packet 142 of a message can contain different synchronization symbol sequences. This is advantageous, but not mandatory.

In detail, FIG. 4a shows a schematic view of a first arrangement of synchronization symbols 144 and data symbols 146 in a data packet 120 or sub-data packet 142, in which a block with synchronization symbols 144 precedes a block with data symbols 146.

FIG. 4b shows a schematic view of a second arrangement of synchronization symbols 144 and data symbols 146 in a data packet 120 or sub-data packet 142, in which a block of data symbols 146 is arranged between two blocks of synchronization symbols 144 (split synchronization sequence).

FIG. 4c shows a schematic view of a third arrangement of synchronization symbols 144 and data symbols 146 in a data packet 120 or sub-data packet 142, in which a block of synchronization symbols 144 is arranged between two blocks of data symbols 146.

FIG. 4d shows a schematic view of a fourth arrangement of synchronization symbols 144 and data symbols 146 in a data packet 120 or sub-data packet 142, in which blocks of data symbols 146 and blocks of synchronization symbols 144 are alternately arranged in the sub-data packet.

The synchronization symbols of an authenticated confirmation of receipt (individual synchronization sequence) can be equally known in the data transmitter 100 and in the addressed data receiver 110. Calculation of the synchronization symbols can be done on the basis of individual communication information (e.g. (numerical) signature) known in the data transmitter 100 and data receiver 110, e.g. in the form of a CMAC. The principle is illustrated in the following FIG. 5.

Figure 5:
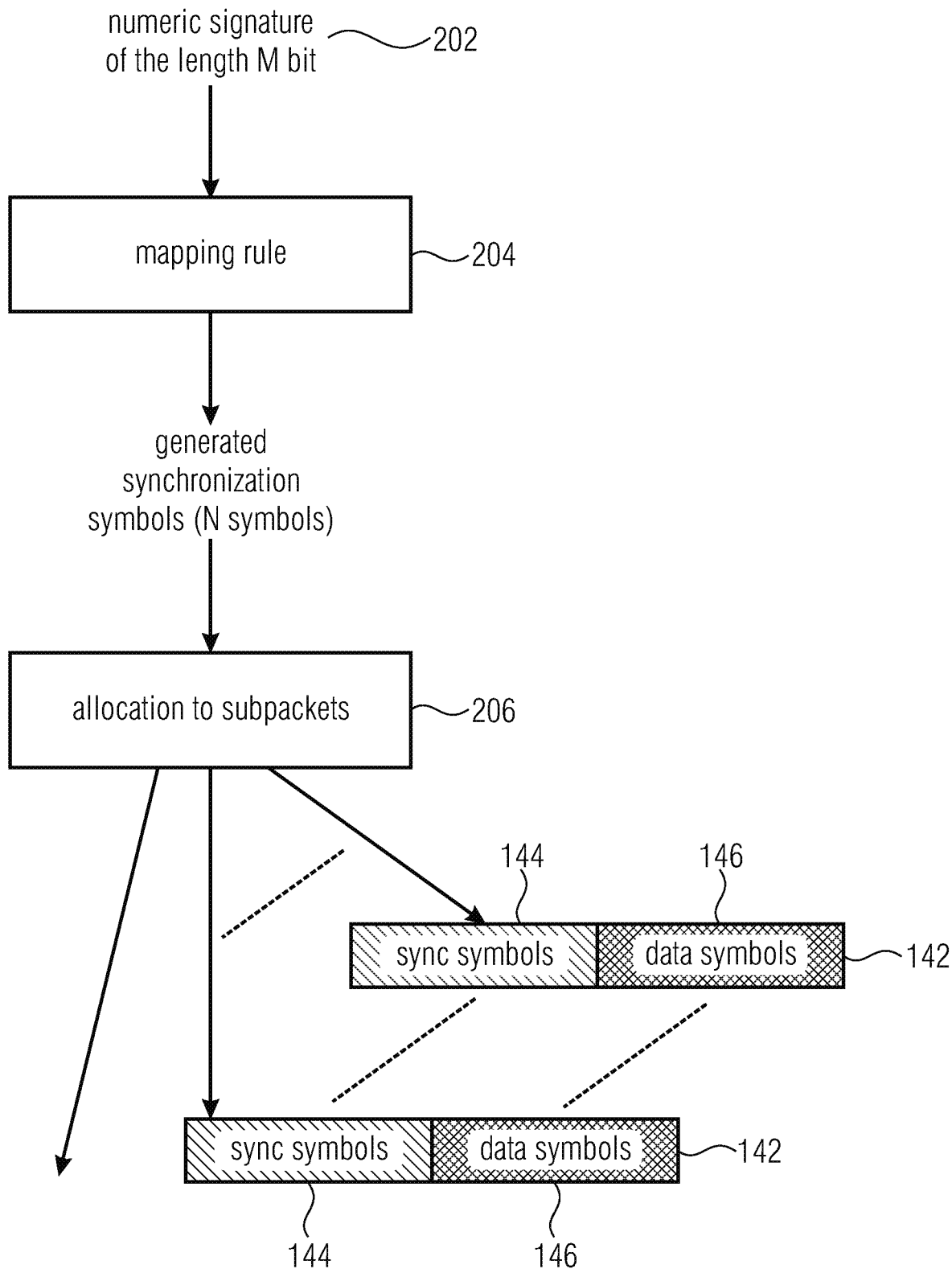
FIG. 5 shows, in a flowchart, a method for generating the synchronization symbols of the individual synchronization sequence.

FIG. 5 shows, in a flowchart, a method 200 for generating the synchronization symbols. In a first step 202, the individual communication information is provided, e.g. by the data transmitter 100, the data receiver 110 or another subscriber of the communication system, such as another data transmitter or data receiver or a central control unit. In a second step, 204, a mapping rule is applied to the individual communication information in order to obtain the individual synchronization sequence (or the entirety of symbols of the individual synchronization sequence). In a third step 206, the individual synchronization sequence can be assigned to the data packet 120 or optionally, as exemplarily shown in FIG. 5, divided among the plurality of sub-data packets 142, as exemplarily indicated in FIG. 5 by the two sub-data packets with the blocks of data symbols 146 and the blocks of synchronization symbols 144.

In other words, the starting point is the individual communication information (e.g. a time-varying numerical signature (e.g. CMAC) of the length M bit). From this, a sequence of the length N symbols can be generated in a suitable mapping rule. By means of an assignment rule, the N symbols can be mapped to the synchronization areas available for the message of the data packet 120 or the sub-data packets 142.

Depending on the signature length and the number and modulation of the synchronization symbols, the mapping rule can, from an information-theoretical point of view, in principle both introduce redundancy into the numerical signature and reduce the information content of the signature. In the case of transmission via disturbed radio channels, however, redundancy can be introduced in an advantageous manner by the mapping rule in order to be able to restore and verify the signature in the data receiver 110 even in case of a transmission loss of one or more synchronization symbols. This can be done, for example, by FEC coding (FEC=forward error correction) on the basis of common folding or turbo codes, as is usually used for data transmission via disturbed channels according to conventional technology.

The appropriate choice of the mapping rule is therefore primarily determined by the length of the signature, the number of synchronization symbols available and/or the desired transmission security of the signature.

Similar to the individual communication information, the mapping rule can also be known to both the data transmitter and the data receiver.

Insofar as the data package 120 is optionally divided among the majority of sub-data packets 142, the assignment of the synchronization symbols to the sub-data packets 142 can be a bijective mapping (or assignment). Thereby, no information is added or reduced. In other words, it can be a bijective mapping by means of which the synchronization symbols can be distributed to the synchronization area of the sub-data packets.

In embodiments, individual communication information (e.g. a numerical signature of suitable length) can be generated on the data transmitter side or data receiver side and exchanged between data transmitter and data receiver. In order to arrange authentication as secure as possible, a dynamic (time-variable) signature of sufficient length can be selected, for example.

For this purpose, for example a CMAC is suitable.

On the data transmitter side (or waveform side), the individual synchronization sequence (e.g. synchronization symbol sequence) can be formed from the individual communication information (e.g. above-mentioned signature) with the aid of the mapping rule and, if telegram splitting is used, assigned to sub-data packets 142.

On the data receiver side (or decoder side), the individual synchronization sequence can be formed from the individual communication information (e.g. above-mentioned signature) with the aid of the mapping rule and, if telegram splitting is used, assigned to sub-data packets 142. The synchronization of the received message in time, phase, sampling phase, frequency and/or channel estimation can be done on the basis of the individual synchronization sequence. The authentication of the received message can further be done by retrieving the sent individual communication information (e.g. numerical signature) from the received signal. Even though this is known in the data receiver, it can be additionally verified by demodulation of the received individual synchronization sequence and application of the inverse mapping rule (e.g. by decoding). No expectations ("a-priori knowledge") are assumed with regard to the known sequence.

Third Detailed Embodiment

The data transmitter 100 can be configured to repeatedly transmit the data packet with the individual synchronization sequence, thus, to repeat the confirmation of receipt.

For example, the authenticated confirmation of receipt can be transmitted K-fold with identical content, i.e. identical transmission symbols. K is generally an integer value greater than 1. The number of repetitions can be specified as a fixed parameter, or depending on the situation, can be redefined by the data transmitter on a case-by-case basis (dynamic number of repetitions). A limited transmission time (duty cycle to be observed) or the evaluation of the radio connection quality between data transmitter and data receiver can serve as a basis for the dynamic definition of a repetition number.

In the event of poor receiving conditions, the repetition can serve to increase the probability that the confirmation of receipt can be evaluated (decoded) without errors in the addressed data receiver. In the case of good receiving conditions, the data receiver can evaluate the authenticated confirmation of receipt without errors after less than K received transmissions and, thus, prematurely shut down the receiving module. This receiver shutdown potentially reduces power consumption, which increases battery life for battery-powered devices.

If the authenticated confirmation of receipt is transmitted in the form of sub-data packets, each sub-data packet is retransmitted accordingly during repetition. The transmission times of all sub-data packets are known to the data receiver.

In embodiments, the authenticated confirmation of receipt can be transmitted several times, e.g. with identical content, i.e. identical transmission symbols, on the data transmitter side (or waveform side). Insofar as telegram splitting is used, the repeated sub-data packets 142 do not necessarily have to be transmitted in the same time/frequency grid when the data packet 120 (=receipt confirmation) is repeated, but can be sent in different ways in the available time and frequency resources. This includes the case where the repetition does not necessarily take place after the first transmission, but also in parallel or partially overlapping time with the first transmission while using separate time/frequency resources. If the number of repetitions is determined dynamically, the radio link quality between the data transmitter and the data receiver and/or the compliance with a specified maximum transmission activity ("duty cycle") can serve as criteria.

In embodiments, an attempt can be made on the data receiver side (or decoder side) after each emission operation to evaluate the authenticated confirmation of receipt (e.g. by decoding). In the event of success, the data receiver can be deactivated with regard to the subsequent repetitions of the authenticated confirmation of receipt. If a successful evaluation cannot be achieved after each transmission/emission, the data receiver can accumulate the information content already transmitted. This can be done, for example, by so-called "soft bit combining".

Fourth Detailed Embodiment

The data transmitter 100 may be configured to provide the data packet 120 with additional activation information on at least one further data packet to be transmitted by the data transmitter 100. The data transmitter 100 can therefore use the data packet 120 to transmit further information for future data packets (or messages).

Thus, the data transmitter 100 can provide the data packet 120 comprising the individual synchronization sequence which due to the individual synchronization sequence can be a confirmation message (or confirmation of receipt), by means of which the data transmitter 100 confirms the successful receipt of a preceding data packet, with the additional activation information in order to prepare the data receiver 110 to receive at least one further data packet 124. The activation information can be a transmission time of at least one further data packet and/or structural information (e.g. time and/or frequency hopping pattern, length) of at least one further data packet.

For example, in addition to the actual confirmation of receipt (for a temporally preceding transmission), the data transmitter 100 can also use the same to prepare the data receiver 110 for further planned message transmissions which the data transmitter 100 will carry out after the transmission of the data packet 120 (=confirmation of receipt). For example, this can be information regarding the structure, scope/length, and transmission time of the scheduled message. With the aid of said information, the data receiver 110 of the authenticated confirmation of receipt can specifically prepare to receive the future message or several future messages of the data transmitter 100.

With this measure, for example, the transmission of the future transmission time of the future message(s), the data receiver 110 can deactivate its reception readiness until the planned transmission time and, thus, save energy.

Furthermore, in a system with many data receivers (e.g. sensor nodes) that are basically unsynchronized in terms of time, this measure makes it possible to temporally coordinate the several data receivers for the reception of a common message ("broadcast" mode) and, thus, to effectuate a partially synchronous behavior with regard to the reception.

The further information can optionally be in addition cryptographically protected, wherein a sequence deviating from the numerical signature mentioned above can be the basis.

In embodiments, additional information can be transmitted on the data transmitter side (or waveform side) in the framework of the authenticated confirmation of receipt, which informs the data receiver 110 of relevant parameters relating to structure, scope/length and transmission time of future further messages transmitted (by the sender of the confirmation of receipt). If a transmission in the "broadcast" mode (point-to-multipoint) is provided in the system, a temporal synchronization of the reception readiness of all affected data receivers can be carried out.

In embodiments, the data receiver side (or decoder side) can prepare the data receiver 110 for the expected future message(s) of the data transmitter 100 (or sender) after an extraction of the above information. Furthermore, the data receiver (or parts thereof) may be deactivated until the time of the announced new message(s) for the purpose of energy saving.

Fifth Detailed Embodiment

The transmission of a message (telegram) can optionally take place in the form of several sub-data packets 142 which can be distributed over the radio channel resources "transmission time" and/or "transmission frequency". The prerequisite for the embodiment described below is that a message is transmitted in the form of at least two sub-data packets 142 and that different time and/or frequency resources are available for the transmission of the sub-data packets 142 or at least two different time and/or frequency resources.

Figure 6:
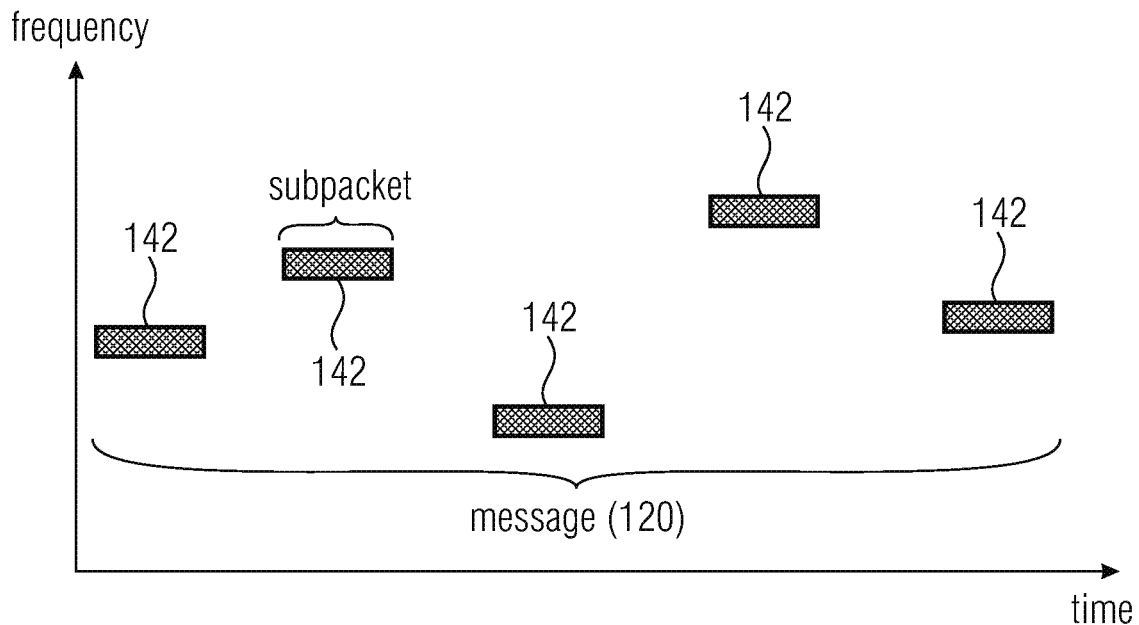
FIG. 6 shows, in a diagram, an occupancy of the transmission channel during the transmission of a data packet by means of a plurality of sub-data packets which are distributed in time and frequency.

FIG. 6 shows in a diagram an occupancy of the transmission channel during the transmission of a data packet by means of a plurality of sub-data packets 142 which are distributed in time and frequency. In other words, FIG. 6 shows a division of a message over several sub-data packets 142 in time and frequency. Thereby, the ordinate describes the frequency and the abscissa the time.

The arrangement of the sub-data packets 142 of a message can be described as a hopping pattern. When allocating hopping patterns, the data transmitter 100 (sender of the message) typically has a large degree of freedom within system-dependent limits. The requirement is that the applied hopping pattern is known in the data receiver 110 or can be determined before the message is received.

With reference to the data packet 120 with the individual synchronization sequence (=authenticated confirmation of receipt), the hopping pattern can be dynamically selected on the basis of the same individual communication information (e.g. numerical signature (e.g. CMAC)), which is used in the second detailed embodiment.

Figure 7:
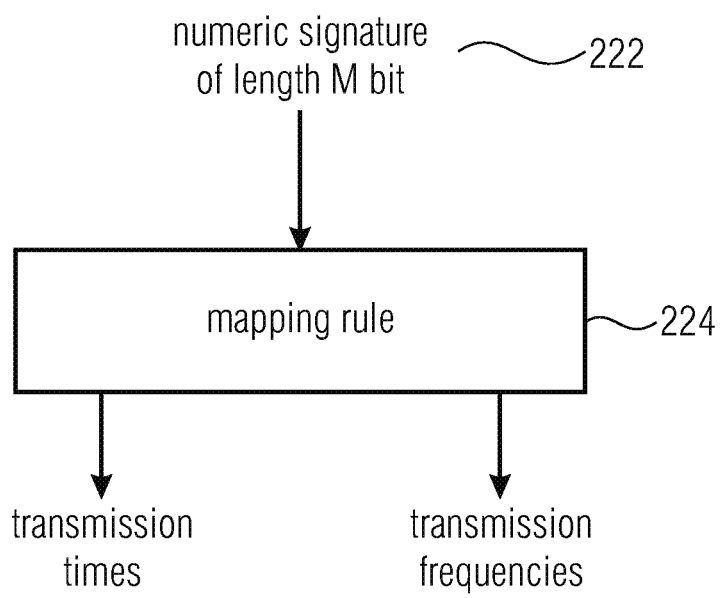
FIG. 7 shows, in a flow chart, a method for generating a time and/or frequency hopping pattern.

FIG. 7 shows, in a flowchart, a method 220 for generating a time and/or frequency hopping pattern. In a first step 222, the individual communication information (e.g. numerical signature of length M bit, cf. FIG. 5) can be provided. As already described above, the individual communication information can be generated by the data transmitter 100, the data receiver 110 or another subscriber of the system, such as another data transmitter, another data receiver or a central control unit. In a second step 224, a mapping rule can be applied to the individual communication information to generate the time and/or frequency hopping pattern (transmission times and transmission frequencies).

Thus, FIG. 7 shows the generation of the hopping pattern (transmission times, transmission frequencies) from the signature. For example, the mapping rule can calculate the values of the transmission times and transmission frequencies for all sub-data packets 142 belonging to the message from the respective individual communication information (numerical signature). Thereby, it is advantageous to aim for each possible piece of individual communication information (signature) to lead to a different selection of transmission times and transmission frequencies. The mapping rule can be known in the data transmitter 100 and data receiver 110.

The advantage of a dynamic, signature-dependent hopping pattern is that the arrangement of the sub-data packets of the message with regard to transmission time and transmission frequency is unknown to any other than the addressed radio subscriber (data receiver 110). This significantly complicates the unintended interception of messages, e.g. by recording the radio connection ("sniffing"), and thus, represents an additional security feature. Furthermore, the targeted manipulation of the data receiver by unauthorized (external) transmitters can be made more difficult, which superimpose or interfere with the signal of the authorized data transmitter 100 on the radio link.

In embodiments, individual communication information (e.g. numerical signature with a suitable length) can be generated on the data transmitter side (or waveform side) and exchanged between data transmitter 100 and data receiver 110. For example, the individual communication information can be a dynamic (temporally variable) signature of sufficient length, such as a CMAC (see second detailed embodiment). According to a suitable mapping rule, the sub-data packets to be sent can be distributed individually on the basis of the individual communication information (e.g. above-mentioned signature) with regard to the transmission times and the transmission frequencies.

In embodiments, the transmission times and transmission frequencies on the data receiver side (or decoder side) can be calculated from the individual communication information (e.g. above-mentioned signature) using the mapping rule known in the data receiver 110. The receiving module (or reception unit 116) of the data receiver 110 can be controlled such that it detects and evaluates the radio signals at the preset times on the preset frequencies.

Further Design Embodiments

Figure 8:
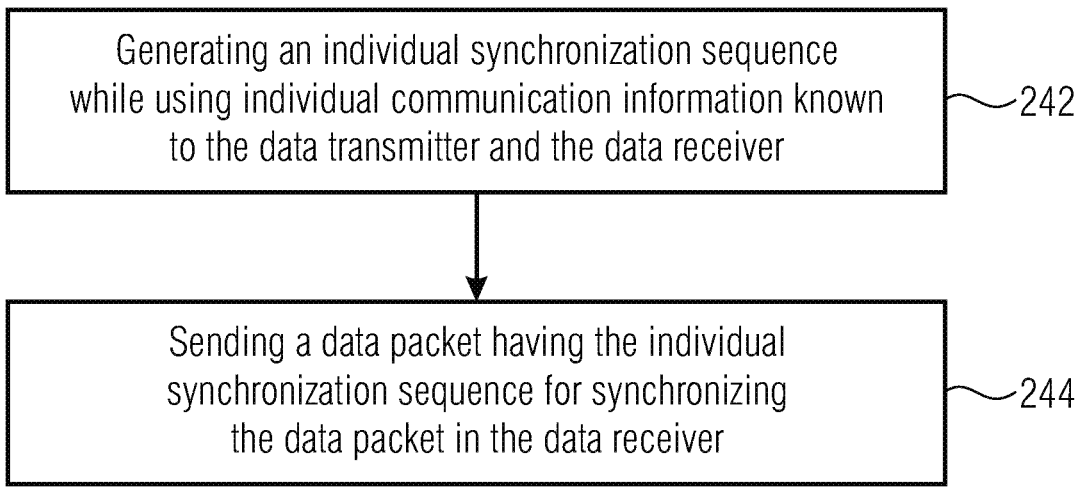
FIG. 8 shows a flow diagram of a method for transmitting data to a data receiver according to an embodiment.

FIG. 8 shows a flowchart of a method 240 for transmitting data to a data receiver, according to an embodiment. The method 240 includes a step 242 of generating an individual synchronization sequence while using individual communication information known to the data transmitter and the data receiver. Further, the method 240 includes a step 244 of transmitting a data packet comprising the individual synchronization sequence for synchronizing the data packet in the data receiver.

Figure 9:
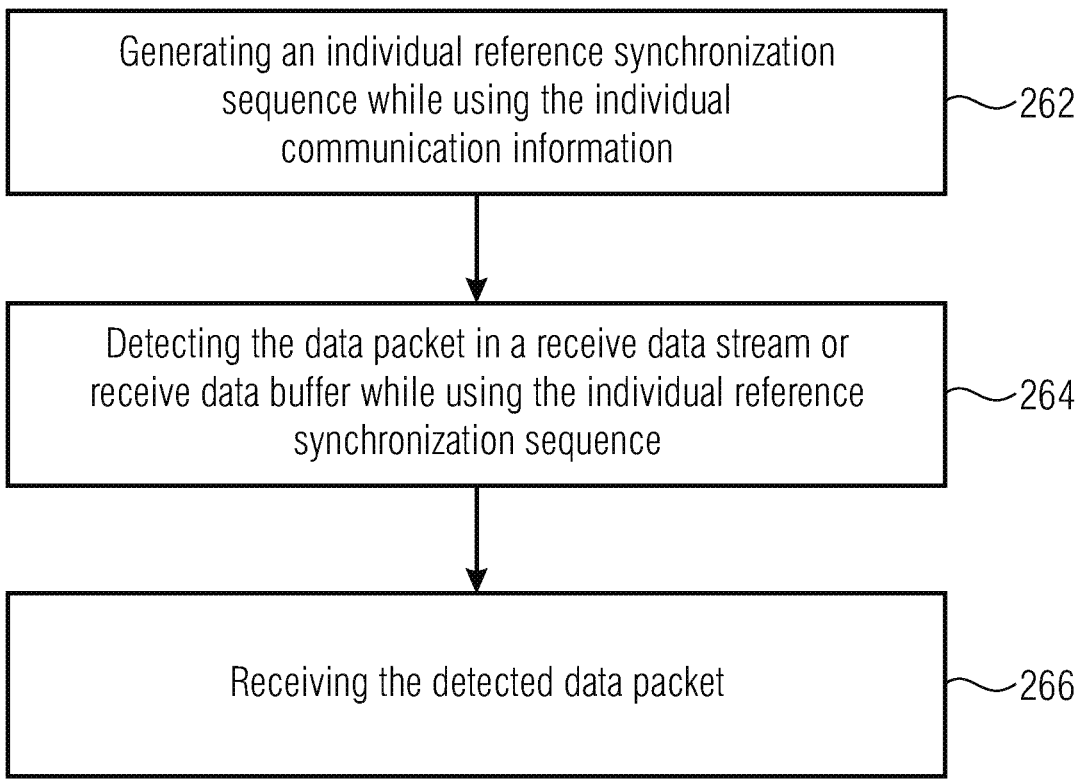
FIG. 9 shows a flowchart of a method for receiving data from a data transmitter according to an embodiment.

FIG. 9 shows a flowchart of a method 260 for receiving data from a data transmitter, according to an embodiment. The method 260 includes a step 262 of generating an individual reference synchronization sequence while using the individual communication information. Further, the method 260 includes a step 264 of detecting the data packet in a receive data stream or receive data buffer while using the individual reference synchronization sequence. Further, the method 260 includes a step 266 of receiving the detected data packet.

Embodiments relate to a data transmitter, a data receiver and/or a system for bidirectional transmission of data from many sensor nodes to a base station or in the other direction from one or more base station(s) to one or more sensor nodes.

Embodiments are a type of transmission in which the successful receipt of a message is confirmed by the data receiver in authenticated form ("Acknowledge") and in which the data receiver simultaneously forwards relevant information to the sender of the original message with the confirmation of receipt for optional emission of further data with a separate message following the confirmation message.

In embodiments, successful receipt of a message transmitted from subscriber A to subscriber B can be confirmed. Some embodiments refer to the authenticated confirmation of receipt by subscriber B (cf. FIG. 3).

In embodiments, a confirmation message (e.g. from subscriber B to subscriber A) can be authenticated by emitting a synchronization sequence on frequency, phase and channel estimation, the content of which is known in the system only to the addressed data receiver (subscriber A) in addition to the sender (subscriber B).

In embodiments, the above synchronization sequence can be derived/calculated on the basis of a numerical signature known both in the data transmitter (subscriber B) and in the data receiver (subscriber A).

In embodiments, the entire authenticated confirmation message may be repeated once or more to increase the probability of successful transmission. The authenticated confirmation message can be configured such that complete receipt of the message is possible even without its repetition.

In embodiments, further information can be transmitted with the confirmation message, which transmit information to subscriber A in particular about the time and length of an optional future message transmission by subscriber B, whereby subscriber A can activate its receiving module specifically at the scheduled time.

In embodiments, the data transmitter may be configured to transmit an authenticated confirmation of receipt of a previously received message.

In embodiments, while using the authentication information from the preceding message (e.g. only known to the data transmitter and data receiver) saving of data can be achieved, since it is not necessary to transmit new authentication information.

In embodiments, the authentication information may be a cryptographic signature based on the preceding message. For example, the authentication information may be a CMAC based on the preceding message.

In embodiments, the authentication information may be information from an encrypted part of the preceding message.

In embodiments, the synchronization sequence can only be generated from data of the preceding message, i.e. the synchronization sequence is not "allocated", In embodiments, the synchronization symbols can be generated from the authentication information by a mapping rule.

For example, the mapping rule may be based on an FEC (e.g. a Hamming-Code or Convolutional Code). For example, the known authentication information can be submitted together with the FEC data, wherein some of the generated data being defined only by the authentication information.

For example, only part of the authentication information can be used to generate the synchronization symbols.

In embodiments, in addition to the authenticated confirmation of receipt, further information about the following (sub-) data packets (length, hopping pattern, . . . ) can be transmitted in the packet.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data transmitter for transmitting data to a data receiver, individual communication information being known to the data transmitter and to the data receiver, the data transmitter being configured to generate an individual synchronization sequence while using said individual communication information; and
said individual communication information being information which authenticates the data transmitter and/or information which authenticates a data packet of the data transmitter,
said individual communication information being known only
to the data transmitter and to the data receiver, or
to the data transmitter and to a group of data receivers.

2. The data transmitter as claimed in claim 1, the data transmitter being configured to generate the individual synchronization sequence from the individual communication information while using a mapping specification.

3. The data transmitter as claimed in claim 1, the data transmitter being configured to transmit in advance a data packet comprising the individual communication information to the data receiver or to receive in advance the individual communication information from the data receiver.

4. The data transmitter as claimed in claim 3, the data transmitter being configured to provide the data packet with a synchronization sequence known only to the data receiver and/or to a limited group of data receivers.

5. The data transmitter as claimed in claim 1, the data transmitter being configured to provide a data packet to be transmitted with the individual synchronization sequence for synchronization of the data packet in the data receiver.

6. The data transmitter as claimed in claim 1, wherein the individual communication information is individual for communication between the data transmitter and the data receiver.

7. The data transmitter as claimed in claim 1, wherein the communication information is known only to the data transmitter and the data receiver or a limited group of data receivers.

8. The data transmitter as claimed in claim 1, the data transmitter being configured to renew the individual communication information after each data packet or a certain time interval.

9. The data transmitter as claimed in claim 1, wherein the individual communication information is a signature.

10. The data transmitter as claimed in claim 9, wherein the individual communication information is a cipher-based message authentication code.

11. The data transmitter as claimed in claim 1, the data transmitter being configured to divide the data packet into a plurality of sub-data packets and to transmit the plurality of sub-data packets distributed in time and/or frequency to the data receiver.

12. The data transmitter as claimed in claim 11, the data transmitter being configured to divide the data packet into the plurality of sub-data packets such that the individual synchronization sequence is divided among the plurality of sub-data packets.

13. The data transmitter as claimed in claim 11, the data transmitter being configured to generate a time hopping pattern and/or frequency hopping pattern with which the plurality of sub-data packets are transmitted so as to be distributed in time and/or frequency while using the individual communication information.

14. The data transmitter as claimed in claim 1, the data transmitter being configured to repeatedly transmit the data packet with the individual synchronization sequence.

15. The data transmitter as claimed in claim 14, the data transmitter being configured to divide the data packet into a plurality of sub-data packets and to transmit the plurality of sub-data packets distributed to the data receiver in time and/or frequency according to a time and/or frequency hopping pattern;
said data transmitter being configured to use a different time and/or frequency hopping pattern during repeated emission of the data packet with the individual synchronization sequence.

16. The data transmitter as claimed in claim 1, the data packet with the individual synchronization sequence being a confirmation message due to the individual synchronization sequence which the data transmitter transmits in response to a correct receipt of a preceding data packet.

17. The data transmitter as claimed in claim 1, the data transmitter being configured to provide the data packet with additional activation information about at least one further data packet to be transmitted from the data transmitter.

18. The data transmitter as claimed in claim 17, wherein the activation information specifies a transmission time or structural information of the at least one further data packet.

19. A data transmitter for transmitting data to a plurality of data receivers, the data transmitter being configured such that individual communication information for individual communication between the data transmitter and the one data receiver is known to the data transmitter and to one data receiver of the plurality of data receivers, the data transmitter being configured to generate an individual synchronization sequence while using the individual communication information and to provide a data packet to be transmitted with the individual synchronization sequence for synchronization of the data packet in the data receiver; and
said individual communication information being information authenticating the data transmitter and/or information authenticating a data packet of the data transmitter;

said individual communication information being known only
    to the data transmitter and to the data receiver, or
    to the data transmitter and to a group of data receivers.
20. A system, comprising the following features:
a data transmitter as claimed in claim 1; and
a data receiver for receiving data from a data transmitter transmitted by the data transmitter in a data packet, the data packet being provided with an individual synchronization sequence generated while using individual communication information known to the data transmitter and the data receiver, the data receiver being configured to generate an individual reference synchronization sequence while using the communication information and to detect the data packet to be received while using the individual reference synchronization sequence in a receive data stream or receive data buffer;
said individual communication information being information authenticating the data transmitter and/or a data packet of the data transmitter;
said individual communication information being known only
    to the data transmitter and to the data receiver, or
    to the data transmitter and to a group of data receivers.
21. A system, comprising the following features:
a data transmitter as claimed in claim 19; and
a data receiver for receiving data from a data transmitter transmitted by the data transmitter in a data packet, the data packet being provided with an individual synchronization sequence generated while using individual communication information known to the data transmitter and the data receiver, the data receiver being configured to generate an individual reference synchronization sequence while using the communication information and to detect the data packet to be received while using the individual reference synchronization sequence in a receive data stream or receive data buffer;
said individual communication information being information authenticating the data transmitter and/or a data packet of the data transmitter;
said individual communication information being known only
    to the data transmitter and to the data receiver, or
    to the data transmitter and to a group of data receiver.
22. A method for transmitting data to a data receiver, the method comprising:
    generating an individual synchronization sequence while using individual communication information known to the data transmitter and the data receiver; and
    transmitting a data packet comprising the individual synchronization sequence for synchronizing the data packet in the data receiver;
    said individual communication information being information authenticating the data transmitter and/or information authenticating a data packet of the data transmitter;
    said individual communication information being known only
        to the data transmitter and to the data receiver, or
        to the data transmitter and to a group of data receivers.
23. A method for transmitting an authenticated confirmation of receipt which confirms receipt of a preceding data packet transmitted by a first subscriber of a communication system, the method comprising:
    receiving the preceding data packet with a second subscriber of the communication system; and
    transmitting a data packet comprising an individual synchronization sequence from the second subscriber to the first subscriber upon successful receipt of the preceding data packet, the individual synchronization sequence being generated from individual communication information which is individually assigned to the first subscriber and the second subscriber for mutual communication;
    said individual communication information being information authenticating the data transmitter and/or information authenticating a data packet of the data transmitter;
    said individual communication information being known only
        to the data transmitter and to the data receiver, or
        to the data transmitter and to a group of data receivers.
24. A non-transitory digital storage medium having a computer program stored thereon to perform the method as claimed in claim 22, when said computer program is run by a computer.
25. A non-transitory digital storage medium having a computer program stored thereon to perform the method as claimed in claim 23, when said computer program is run by a computer.
26. A data transmitter for transmitting data to a data receiver, the data transmitter being configured such that individual communication information is known to the data transmitter and the data receiver, the data transmitter being configured to generate an individual synchronization sequence while using the individual communication information; and
    said data transmitter being configured to derive the individual communication information from a preceding communication between the data transmitter and the data receiver; wherein the individual communication information is a cryptographic signature;
    or wherein the individual communication information is an encrypted part of the preceding communication;
    said individual communication information being known only
        to the data transmitter and to the data receiver, or
        to the data transmitter and to a group of data receivers.
27. The data transmitter as claimed in claim 26, the data transmitter being configured to generate the individual synchronization sequence from the individual communication information while using a mapping specification.
28. The data transmitter as claimed in claim 26, wherein the cryptographic signature is a cipher-based message authentication code (CMAC).
29. The data transmitter as claimed in claim 1, the preceding communication being a preceding data packet received by the data transmitter from the data receiver.
30. The data transmitter as claimed in claim 19, the preceding communication being a preceding data packet received by the data transmitter from the data receiver.
31. The data transmitter as claimed in claim 26, the preceding communication being a preceding data packet received by the data transmitter from the data receiver.
32. The data transmitter as claimed in claim 1, the data transmitter being configured to generate the individual synchronization sequence while using a mapping rule from the individual communication information.
33. The data transmitter as claimed in claim 19, the data transmitter being configured to generate the individual synchronization sequence while using a mapping rule from the individual communication information.

34. The data transmitter as claimed in claim 26, the data transmitter being configured to generate the individual synchronization sequence while using a mapping rule from the individual communication information.

35. The data transmitter as claimed in claim 32, the data transmitter being configured to generate the individual synchronization sequence exclusively from the individual communication information.

36. The data transmitter as claimed in claim 1, wherein the data packet comprising the individual synchronization sequence due to the individual synchronization sequence is an authenticated confirmation of receipt which the data transmitter transmits in response to correct receipt of a preceding data packet.

37. The data transmitter as claimed in claim 19, wherein the data packet comprising the individual synchronization sequence due to the individual synchronization sequence is an authenticated confirmation of receipt which the data transmitter transmits in response to correct receipt of a preceding data packet.

38. The data transmitter as claimed in claim 26, wherein the data packet comprising the individual synchronization sequence due to the individual synchronization sequence is an authenticated confirmation of receipt which the data transmitter transmits in response to correct receipt of a preceding data packet.

39. A method for transmitting data to a data receiver, the method comprising:
- generating an individual synchronization sequence while using individual communication information known to the data transmitter and the data receiver; and
- transmitting a data packet comprising the individual synchronization sequence for synchronizing the data packet in the data receiver;
- said individual communication information being derived from a preceding communication between the data transmitter and the data receiver;
- wherein the individual communication information is a cryptographic signature;
- or wherein the individual communication information is an encrypted part of the preceding communication;
- said individual communication information being known only
  - to the data transmitter and to the data receiver, or
  - to the data transmitter and to a group of data receivers.

40. A non-transitory digital storage medium having a computer program stored thereon to perform the method as claimed claim 39, when said computer program is run by a computer.

* * * * *